United States Patent
Engstrom et al.

(10) Patent No.: US 7,251,474 B2
(45) Date of Patent: Jul. 31, 2007

(54) IDENTIFICATION BASED OPERATIONAL MODIFICATION OF A PORTABLE ELECTRONIC DEVICE

(75) Inventors: G. Eric Engstrom, Kirkland, WA (US); Peter Zatloukal, Duvall, WA (US)

(73) Assignee: Wildseed, Ltd., Seattle, WA (US)

( * ) Notice: Subject to any disclaimer, the term of this patent is extended or adjusted under 35 U.S.C. 154(b) by 0 days.

(21) Appl. No.: 11/332,649

(22) Filed: Jan. 13, 2006

(65) Prior Publication Data

US 2006/0121885 A1     Jun. 8, 2006

Related U.S. Application Data

(62) Division of application No. 10/265,185, filed on Oct. 3, 2002, now Pat. No. 6,987,948.

(51) Int. Cl.
*H04M 1/66* (2006.01)
(52) U.S. Cl. ............. 455/411; 455/410; 455/420; 455/426.1
(58) Field of Classification Search ............. 455/411, 455/410, 420, 421, 426.1, 41.1, 41.2; 340/572.1
See application file for complete search history.

(56) References Cited

U.S. PATENT DOCUMENTS

| | | | |
|---|---|---|---|
| 4,689,610 A * | 8/1987 | Dietrich | 340/515 |
| 5,640,002 A * | 6/1997 | Ruppert et al. | 235/462.46 |
| 5,886,634 A | 3/1999 | Muhme | |
| 5,901,209 A * | 5/1999 | Tannenbaum et al. | 379/142.09 |
| 6,002,921 A * | 12/1999 | Pfahlert et al. | 455/575.9 |
| 6,008,727 A * | 12/1999 | Want et al. | 340/572.1 |
| 6,021,712 A * | 2/2000 | Harrop | 100/43 |
| 6,087,952 A | 7/2000 | Prabhakaran | |
| 6,097,301 A | 8/2000 | Tuttle | |
| 6,346,884 B1 | 2/2002 | Uozumi et al. | |
| 6,356,764 B1 | 3/2002 | Ovard et al. | |
| 6,483,425 B1 * | 11/2002 | Avenel | 340/5.61 |
| 6,501,807 B1 | 12/2002 | Chieu et al. | |
| 2002/0045971 A1 * | 4/2002 | Banas | 701/1 |
| 2003/0142849 A1 * | 7/2003 | Lemelson et al. | 382/104 |
| 2004/0061612 A1 | 4/2004 | Paradiso et al. | |

* cited by examiner

*Primary Examiner*—Jean Gelin
*Assistant Examiner*—Huy D Nguyen
(74) *Attorney, Agent, or Firm*—Schwabe, Williamson & Wyatt, P.C.

(57) ABSTRACT

Identification based operational modification of a portable electronic device includes detecting the presence of an employee identification badge, authenticating the identification badge as an eligible identification badge based at least in part upon data associated with the identification badge that is individualized to at least the employee and/or employer, and modifying one or more operating characteristics of the portable electronic device resulting in an identification badge authenticated mode of operation for the portable electronic device based upon successful authentication of the identification badge.

26 Claims, 9 Drawing Sheets

Figure 10

IDENTIFICATION BASED OPERATIONAL MODIFICATION OF A PORTABLE ELECTRONIC DEVICE

CROSS-REFERENCE TO RELATED APPLICATION

This application is a division of prior application Ser. No. 10/265,185, filed Oct. 3, 2002, now U.S. Pat. No. 6,987,948 priority from the filing date of which is hereby claimed under 35 U.S.C. § 120.

BACKGROUND OF THE INVENTION

1. Field of the Invention

The present invention relates to the field of portable electronic devices. More specifically, the present invention relates to identification-based modification of operational characteristics of portable electronic devices.

2. Background Information

With the continued proliferation of portable electronic devices, such as wireless mobile phones, personal digital assistants, hand-held computers, etc., into the marketplace, manufacturers of such devices are continually trying to differentiate themselves and their products from the rest of the industry. Similarly, as the number of users owning such portable electronic devices continues to grow, the perceived need for users to differentiate their respective devices from that of their friend's and/or coworker's is becoming more prevalent. In fact, to some users the portable electronic device has become a supplemental means of manifesting one's personality.

In an effort to both appease user demands and differentiate their products in the marketplace, manufacturers have begun to introduce various ways in which users may personalize, and thereby distinguish (whether functionally or aesthetically) their electronic devices from one another. For example, consumers are now able to purchase portable electronic devices in a variety of colors rather than the conventional black or gray, as well as being able to select from a large number of aftermarket interchangeable faceplates, each having it's own cosmetic (i.e. color and image) theme(s). Additionally, consumers are no longer limited to the audio and visual themes prepackaged with "off-the-shelf" wireless communication devices. More specifically, consumers are able to download new ring-tones (i.e. the audible and often musical sounds generated to indicate an incoming call) as well as customized screensavers and games from e.g. the Internet.

Although having the ability to personalize such electronic devices may be a selling point for individuals, it may not always be welcomed by businesses. For example, many businesses offer their employees use of portable electronic devices such as wireless mobile phones for business purposes. Whether authorized or not, many of these employees in turn choose to personalize the business-owned devices by e.g. downloading new ring-tones, screensavers and games. As such, certain businesses may wish to curtail the use of such customized electronic devices by employees, or to at least curtail certain electronic device functionalities such as game playing while the employees are at work.

Furthermore, since many small companies cannot afford to provide their employees with such portable electronic devices, individuals are often forced to use their own personalized devices at work as well as away from the office. In such cases it may be difficult to request that employees not customize their own electronic devices based on the wishes of the employer. Currently, there is no way for companies to restrict personal customized functions and features while at work while allowing such features/functions to be used outside of the office.

Conversely, businesses that offer employees use of portable electronic devices such as wireless mobile phones or PDAs, may wish to enable employee access to certain features/functionalities/data while the employee are at work, but further wish to disable such features/functionalities/data from the employee while the employee is away from work. Currently, there is no way for companies to restrict personal customized functions and features while at work while allowing such features/functions to be used outside of the office, nor is there a way for companies to allow access to business-specific functions and features while at work, while restricting use of such features/functions outside of the office.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description operational modification of portable electronic devices based upon user identification is described. In various embodiments, user identification is provided and authenticated via an employee identification badge. For ease of understanding the present invention will be primarily described in the context of wireless mobile phones and personal digital assistants. However, it is anticipated that the present invention may be practiced on a wide range of other portable electronic devices, including but not limited to game consoles, media players, pagers, and other devices of the like. Accordingly, references to wireless mobile phones and personal digital assistants in the description to follow are merely illustrative, and are not to be read as limitations to the claims.

In the following description, various aspects of the present invention will be described. For purposes of explanation, specific numbers, materials and configurations are set forth in order to provide a thorough understanding of the present invention. However, the present invention may be practiced with only some of the described aspects, and without the specific details. In other instances, well-known features are omitted or simplified in order not to obscure the present invention.

Parts of the description will be presented in terms of operations performed by a computer system, using terms such as data, receiving, detecting and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system, and the term computer system include general purpose as well as special purpose data processing machines, systems, and the like, that are standalone, adjunct or embedded.

Various operations will be described as multiple discrete steps in turn, in a manner that is most helpful in understanding the invention, however, the order of description should not be construed as to imply that these operations are necessarily order dependent. In particular, these operations need not be performed in the order of presentation.

Furthermore, the phrase "in one embodiment" will be used repeatedly, however the phrase does not necessarily refer to the same embodiment, although it may. Further, the terms "comprising", "having", "including" and the like are synonymous.

Overview

Figure 1:
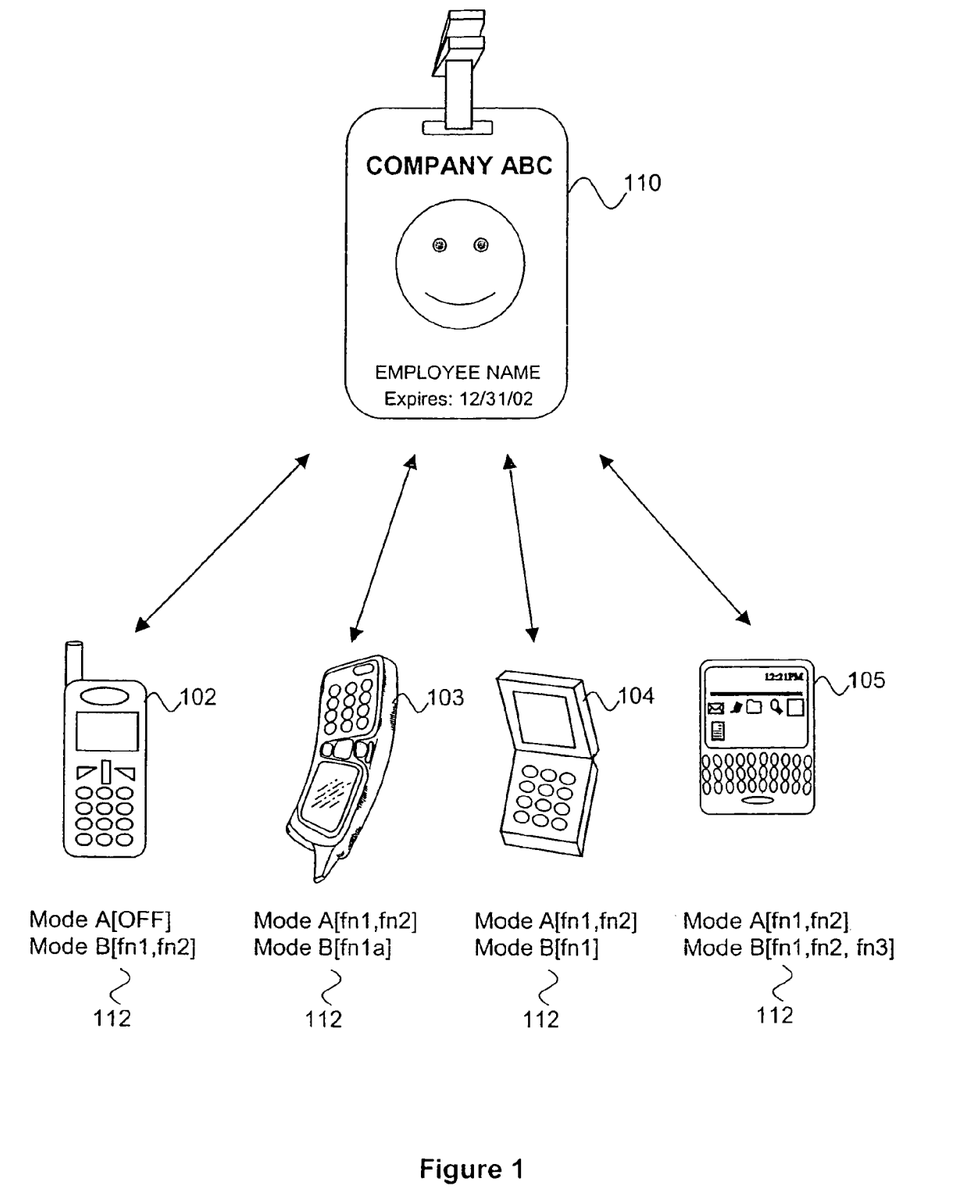
FIG. 1 illustrates an overview of the present invention showing employee identification badge 110 co-located with portable electronic devices 102-105, in accordance with one embodiment of the invention.

FIG. 1 illustrates an overview of the present invention showing employee identification badge 110 co-located with portable electronic devices 102-105, in accordance with one embodiment of the invention. In the illustrated embodiment, identification badge 110 is equipped with one or more embedded electronic components to facilitate data communication between identification badge 110 and one or more of portable electronic devices 102-105. Moreover, one or more of portable electronic devices 102-105 are equipped to detect the presence of identification badge 110 (or one or more of the electronic components embedded within identification badge 110) through at least one of a contact-based coupler and a contactless coupler. In accordance with one embodiment of the invention, detection and/or authentication of identification badge 110 (or one or more of the electronic components embedded within identification badge 110) by one or more of portable electronic devices 102-105, causes one or more operating characteristics of the respective portable electronic device(s) 102-105 to be modified. Similarly, in one embodiment, detection and/or authentication of identification badge 110 by one or more of portable electronic devices 102-105, causes one or more processes/functions including but not limited to file synchronization, email synchronization, email message attachment, email message detachment, and so forth, to be launched/invoked. Accordingly, operation of one or more of portable electronic devices 102-105 (including e.g. limited and/or enhanced functionality/features and/or invocation of one or more processes/functions) can be conditioned based upon e.g. proper employee identification.

In both the description and claims to follow, the term "operating characteristic" is intended to broadly refer to one or more features/functions provided by the portable electronic device(s), and/or one or more traits, qualities and/or attributes associated with the operation of the portable electronic device(s). Moreover, in accordance with one embodiment of the invention, addition, deletion and/or modification of one or more features/functions, or quality/traits of one or more features/functions of a portable electronic device constitute a change in the operational characteristics of the portable electronic device.

Additionally, in both the description and claims to follow, the term employee is intended to refer to a person, person(s) or entity such as a placement agency who is acting or appears to be acting as an agent for and may have entered into a agreement (whether oral, written, or implied) with an employer. An employee may provide goods and/or services to an employer in a variety of capacities and relationships including full-time, part-time, paid, unpaid, volunteer, third party, contract, and so forth. For example, an employer may hire a temporary placement agency to fill a vacant position offered by the employer. Although the employer may have entered into an agreement directly with the placement agency, both the placement agency and employees hired by the placement agency would be considered employees of the employer in accordance with the teachings of the present invention.

Furthermore, although in the following description reference is continually made to employee identification, the present invention is not intended to be limited solely to employee identification. For example, operation of portable electronic devices 102-105 can similarly be conditioned (e.g. operational characteristics modified) based upon electronic student identification, military identification, or any other identification badges, cards, or devices containing one or more electronic components to facilitate communication with portable electronic devices 102-105.

In one embodiment of the invention, identification badge 110 is uniquely associated (e.g. via one or more electronic components embedded in identification badge 110) with one or more portable electronic devices 102-105 such that the operational characteristics of only those portable electronic device(s) associated with identification badge 110 change upon detection of the badge. In other embodiments, the presence of identification badge 110 is only detected by those portable electronic devices associated with identification badge 110. In one embodiment, identification badge 110 is associated with one or more portable electronic devices 102-105 through the generation and respective storage of a linked public/private key set. In such an embodiment, detection of an identification badge by a personal electronic device involves the exchange of one or more public/private keys to authenticate that the badge is an eligible one of a number of badges associated with a given business, and/or to authenticate that a particular identification badge is authorized to utilize a given personal electronic device. In one embodiment, the authentication process requests that the user enter secret data such as a personal identification number (PIN) to further authenticate that employee identified by the badge is in fact the individual who is attempting to use the badge.

In one embodiment, operational characteristics of an associated portable electronic device continue to be modified so long as identification badge 110 continues to be in communication with an associated portable electronic device. In other embodiments, in order to modify one or more operational characteristics of the portable electronic device, identification badge 110 need only be presented to an associated portable electronic device long enough to be detected and authenticated by the portable electronic device.

Furthermore, in the event identification badge 110 includes a contact-based coupler, identification badge 110 may be communicatively linked to the portable electronic device only when conductive contacts (e.g. pins, pads) located on identification badge 110 are in physical contact with complementary conductive contacts on the portable electronic device. Conversely, in the event identification badge 110 and a portable electronic device each include a contactless coupler, identification badge 110 need only be in the vicinity of the portable electronic device in order for an RF based coupling to be made between identification badge 110 and the portable electronic device. The minimum/maximum distances at which such a contactless coupling can be made between identification badge 110 and a portable electronic device may be determined by a number of factors including e.g. the strength of an RF signal generated by an emitter embedded within the identification badge and/or portable electronic device. Depending upon the particular functionality desired, identification badge 110 may be equipped with contact-based coupling facilities, contactless coupling facilities, or both contact-based and contactless coupling facilities (each described in further detail below). Furthermore, depending upon the embodiment, either one of identification badge 110 and the portable electronic device may initiate the RF transmission to facilitate the RF coupling.

Further, in the illustrated embodiment of FIG. 1, detection of identification badge 110 by portable electronic devices 102-105 causes one or more operational characteristics 112 of each respective portable electronic device to be changed/modified. Portable electronic device 102 represents a wireless mobile phone, which as shown, changes from a first non-operational mode to a second mode of operation having e.g. at least first and second functions fn1 and fn2. For example, a business-owned wireless mobile phone, such as wireless mobile phone 102, may be conditionally enabled for use only when an employee identification badge incorporating the teachings of the present invention is placed in proximity to the wireless mobile phone, and may be disabled in the absence of the badge. Accordingly, operation of the business-owned wireless mobile phone can be restricted to those times when the employee is at work assuming e.g. the employee's identification badge is required to be turned in by the employee upon leaving his/her place of employment. Alternatively, a card reader/terminal could (upon arriving or departing from work) set one or more bits within embedded electronic device of the identification badge to indicate whether an employee is present at work (further described below).

Portable electronic device 103 represents an inverted wireless mobile communication device, which upon detecting identification badge 110, changes from a first mode of operation including first and second functions (i.e. fn1 and fn2) to a second mode of operation including modified first function (e.g. fn1a). For example, while using a business-owned wireless communication device, such as inverted wireless mobile phone 103 equipped with the teachings of the present invention, any long-distance calls made by an employee may be billed to the business (or a third party) so long as the wireless mobile phone has detected or is in communication with identification badge 110. Conversely, long-distance calls made by the employee using the wireless communication device outside of the presence of or without the detection of identification badge 110 may instead be billed directly to the employee.

In one embodiment, portable electronic device 103 (or portable electronic devices 102, 104 and 105) is further equipped with an interchangeable smart covering having an embedded electronic device coupled thereto. In one embodiment, the embedded electronic device includes programming instructions/data for personalizing operation of portable electronic device 103 in accordance with one or more operational themes. In one embodiment, detection of identification badge 110 by portable electronic device 103 equipped with such an interchangeable smart covering, causes portable electronic device 103 to change from a first mode of operation including a first group of features/functions to a second mode of operation including a modified group of features/functions, where at least a subset of either group of functions/features are facilitated by the smart covering. Additional details associated with such a smart covering are described in U.S. patent application Ser. No. 10/087,098, filed on Mar. 1, 2002 and having at least one inventor in common with the present application.

Portable electronic device 104 represents a wireless flip-phone/PDA device, which upon detecting identification badge 110, changes from a first mode of operation including first and second functions (i.e. fn1 and fn2) to a second mode of operation including only a subset of such functions (e.g. fn1). For example, operating characteristics of a portable electronic device, such as wireless phone/PDA device 104 equipped with the teachings of the present invention and containing a set of personalized ring-tones, may be modified such that only factory-provided ring-tones and not the personalized ring-tones are active while the employee is at work, thereby e.g. limiting unnecessary distractions. Furthermore, detection of identification badge 110 by a wireless access protocol (WAP) equipped portable electronic device such as wireless phone/PDA device 104 for example, may additionally limit a user's Internet browsing capabilities to only non-offensive web sites while the employee is at work.

Finally, portable electronic device 105 of the illustrated embodiment represents a PDA. As shown, PDA 105 changes from a first mode of operation including first and second functions (i.e. fn1 and fn2) to a second mode of operation, including an additional third function (i.e. fn3) not previously accessible to the employee through the first mode of operation. For example, upon detecting the presence of identification badge 110, a WAP based portable electronic device, such as PDA 105 equipped with the teachings of the present invention, may provide access to one or more websites (e.g. through one or more fully qualified URLs) to facilitate access by an employee to e.g. a corporate intranet/extranet while an employee is at work.

In the above-described examples modification of one or more operational characteristics of one or more portable electronic devices may be premised on the mere detection of an authenticated employee identification badge. Additionally, in accordance with one embodiment of the invention, operational modification of a portable electronic device may further be made contingent upon the outcome of additional processing performed by the portable electronic device and/or the identification badge. For example, detection of identification badge 110 by a portable electronic device may cause a set of personal related data such as, but not limited to personal related contacts, email addresses, phone numbers, and calendar appointments, to be temporarily (e.g. while the employee is at work) supplemented or replaced by a set of business related contacts, addresses, phone numbers, and calendar appointments stored e.g. within a memory component of either the portable electronic device or the identification badge. This modified dataset may, in turn be used to validate operation of the portable electronic device by the employee. For example, calls made to business contacts may be billed to an employee's business, while calls made to non-business contacts may be billed directly to the employee. Furthermore, the making of such business calls may be limited to business hours, and/or days/times that the employee is scheduled to work based e.g. upon the employee's electronic calendar stored within the portable electronic device.

In yet another example, identification badge 110 further functions as a building/door access key, whereby an employee may gain access to a building or door of a building through presentation of the identification badge to e.g. a card reader/terminal. Upon being presented with identification badge 110, the card reader/terminal may in turn set/program one or more bits/flags within a memory component of identification badge 110 to indicate that the employee is "at work". Similarly, upon the employee exiting their place of employment, a card reader/terminal may reset the "at work" bit(s)/flag(s) to indicate that the employee is no longer at work.

Accordingly, various operating characteristics of the wireless mobile phone (as well as other similarly equipped portable electronic devices) can be modified based upon the presence or absence of an employee identification badge.

Identification Badge

Figure 2A:
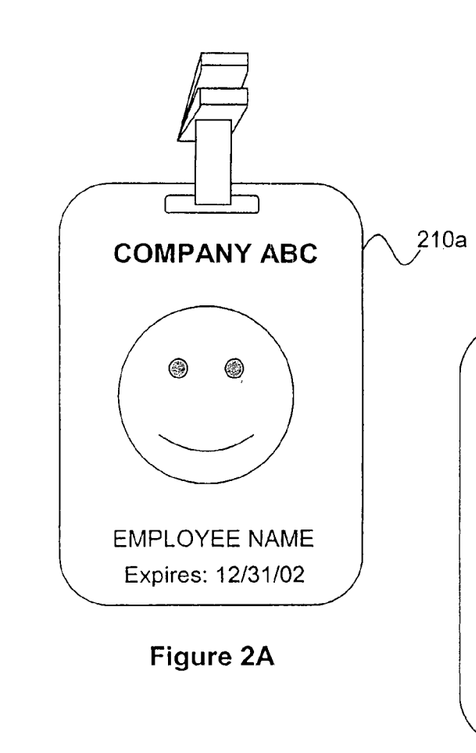
FIGS. 2a-c each illustrates an example employee identification badge in accordance with various embodiments of the invention.
Figure 2B:
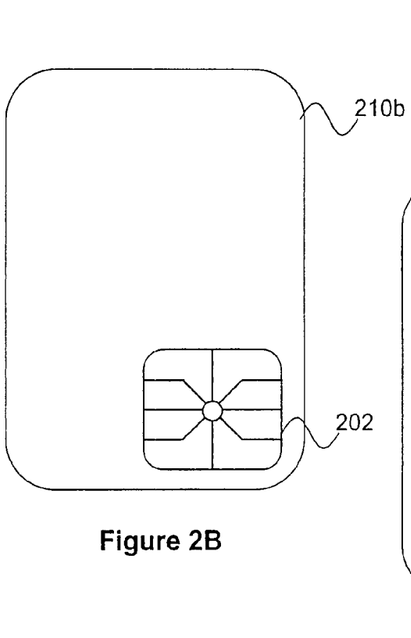
Figure 2C:
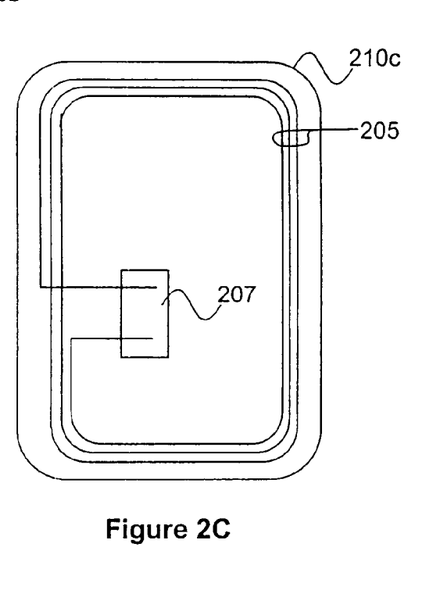

FIGS. 2A-C each illustrates an example employee identification badge in accordance with various embodiments of the invention. FIG. 2A illustrates an example exterior of an employee identification badge, whereas FIG. 2B illustrates an internal view of an employee identification badge including a first embodiment of an embedded electronic device, and FIG. 2C illustrates an internal view of an employee identification badge including a second embodiment of an embedded electronic device.

As shown in FIG. 2A, the outside of identification badge 210 includes e.g. a company/business name, the name of the individual employed by the company/business to whom the identification badge is issued, the date the badge expires, and a photograph identifying the employee. Although identification badge 210 graphically depicts various employee-specific data, such external markings are illustrated for the purpose of example and should not be interpreted as limiting the invention. For example, an employee may also/instead be identified by one or more bit patterns/values stored within the corresponding employee's identification badge.

Identification badge 210b illustrates an internal view of one embodiment of an identification badge incorporating the teachings of the present invention. As shown, identification badge 210b includes electronic component 202 having a contact-based coupler (not shown) connected to electronic component 202 to facilitate communication with e.g. one or more personal electronic devices. In one embodiment, electronic component 202 represents an integrated circuit containing one or more non-volatile memory blocks, such as a flash memory, electrically erasable programmable read only memory (EEPROM), and so forth, a microprocessor block to process stored instructions and data, and an input/output (I/O) block. The I/O block of identification badge 210b includes one or more contact pins and/or pads to transmit/receive signals to/from a badge reader/terminal equipped with a set of complementary I/O pins and/or pads. In one embodiment, one or more personal electronic devices are equipped with such a complementary interface to facilitate communication between the personal electronic device(s) and identification badge 210b.

Identification badge 210c illustrates an internal view of an identification badge incorporating the teachings of the present invention 210. As shown, identification badge 210c includes electronic component 207 and contactless coupler 205. In one embodiment electronic component 207 represents an integrated circuit containing, for example, a memory block, a processing block and a transmit/receive block. In one embodiment, the transmit/receive block includes one or more RF emitters and one or more RF receivers communicatively coupled to contactless coupler 205. Contactless coupler 205 is represented as a number of turns of a conductive material, such as, a wire thin enough to be embedded in the body of identification badge 210c to form an antenna for data signal transmission and reception. As shown in identification badge 210c, the conductive material is turned a number of times around the perimeter of identification badge 210c to match the shape of the badge. The shape of the conductive material may be in any form to transmit and receive data via electromagnetic signals thereby acting as an antenna. The ends of the conductive material are connected to the embedded electronic component 207 by one or more contact pads/pins connected to the embedded electronic component 207 to allow for data to be communicated from/to the component via transmit/receive logic (shown as ref. 330 in FIG. 3B). Although the conductive material shown may be a thin wire, the conductive material may also be any type of conductive material, such as, but not limited to, conductive ink. Since identification badge 210c utilizes contactless coupler 205 in the form of an antenna for receiving and transmitting data to e.g. a personal electronic device, the contact pads/pins previously described with respect to identification badge 210b including a contact-based coupler are not necessary for transmission and reception of data and/or power.

Figure 3A:
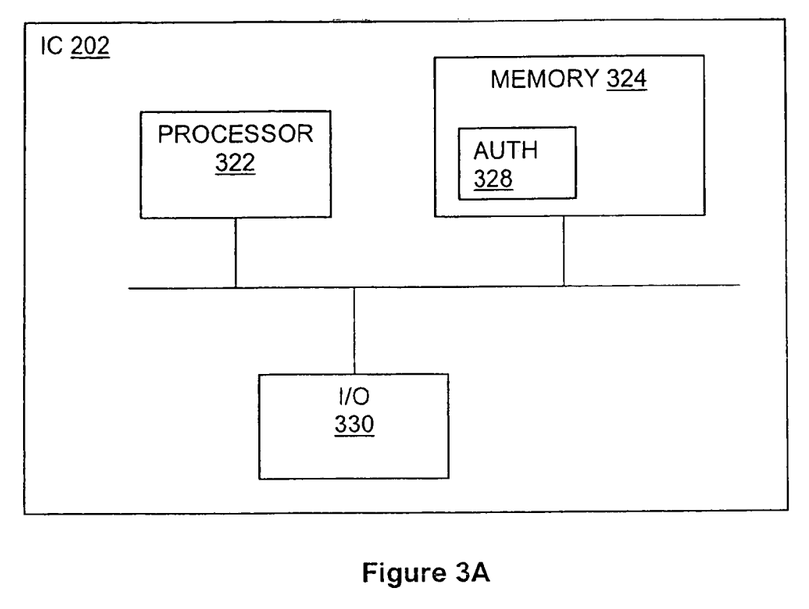
FIG. 3A illustrates an architectural view of one embodiment of embedded electronic component 202 of contact-based identification badge 210B incorporated with the teachings of the present invention.
Figure 3B:
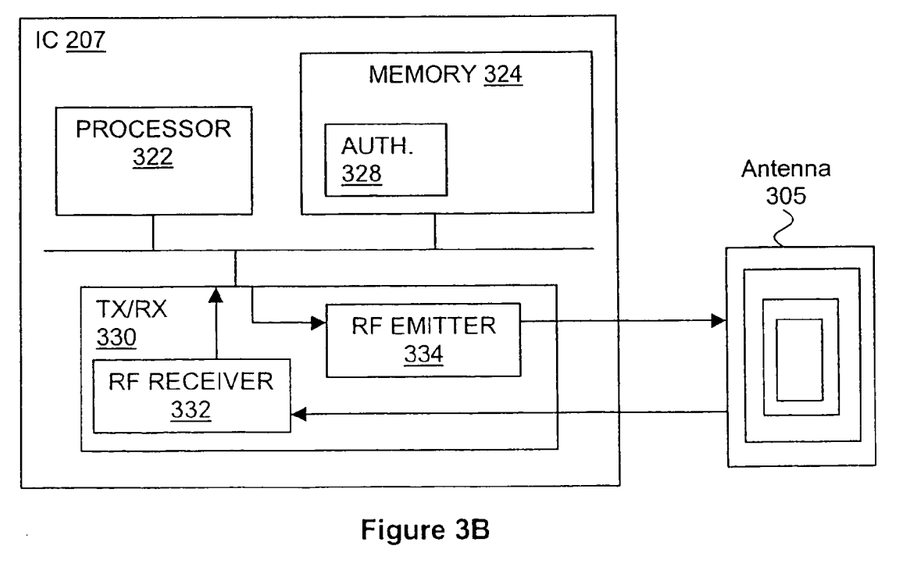
FIG. 3B illustrates an architectural view of one embodiment of embedded electronic component 207 of contactless identification badge 210C incorporated with the teachings of the present invention.

FIG. 3A illustrates an architectural view of one embodiment of embedded electronic component 202 of contact-based identification badge 210b, while FIG. 3B illustrates an architectural view of one embodiment of embedded electronic component 207 of contactless identification badge 210c, each incorporated with the teachings of the present invention. Reference is first made to electronic component 202, which for the embodiment represents an integrated circuit including processor 322, I/O block 330, and memory block 324 endowed with at least authentication logic 328. Processor 322 represents one of a general purpose or special purpose processors to manage memory allocation and access to data stored within memory 324. Memory 324 represents a non-volatile memory device such as a ROM, FLASH memory, an EEPROM, and so forth. In the present embodiment, memory 324 includes authentication logic 328, which represents one or more public/private encryption keys to facilitate recognition of identification badge 210b as an eligible one of a number badges, and to facilitate authentication of the employee/badge by a personal electronic device. In certain embodiments, memory 324 may further include data and/or implementing instructions representing one or more features/functions to supplement operation/ functionality of a personal electronic device when communicated to the personal electronic device. Finally, I/O 330 represents one or more contact pads to form an interface through which identification badge 210b (and embedded electronic component 202) may be communicatively coupled to e.g. a personal electronic device.

Reference is now made to FIG. 3B where an electronic component in the form of integrated circuit 207 is shown. IC 207 includes processor 322, memory 324 endowed with at least authentication logic 328, and transmit/receive interface 330 including RF receiver 332 and RF emitter 334. In the illustrated embodiment, RF receiver 332 and RF emitter 334 are communicatively coupled to antenna 305 located outside of IC 207, however, in other embodiments antenna 305 may be located within IC 307. Except for the configuration of transmit/receive interface 330 including RF receiver 332 and RF emitter 334 to facilitate contactless communication between identification badge 210c and a personal electronic device equipped with the teachings of the present invention, the functionality of IC 207 is otherwise similar to that of IC 202 and as such, will not be further described.

Personal Electronic Device

Figure 4:
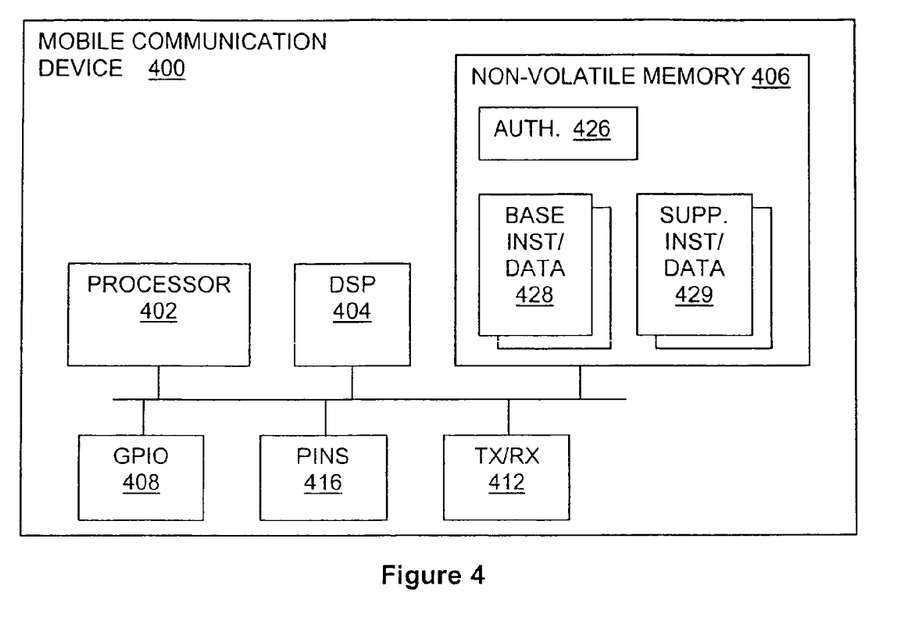
FIG. 4 illustrates an architectural view of one embodiment of a personal electronic device in the form of a mobile communication device incorporating the teachings of the present invention.

FIG. 4 illustrates an architectural view of one embodiment of a personal electronic device in the form of a mobile communication device incorporating the teachings of the present invention. As illustrated, mobile communication device 400 includes elements found in conventional mobile communication devices, such as processor 402, digital signal processor (DSP) 404, non-volatile memory 406, and general-purpose input/output (GPIO) interface 408. For the illustrated embodiment, mobile communication device 400 also advantageously includes contact pins 416 forming an interface to facilitate transfer of data to and from identification badge 210b. However, in other embodiments mobile communication device 400 may advantageously include transmit/receive logic 412 (in place of, or in addition to contact pins 416) to form a contactless interface to facilitate transfer of data to and from identification badge 210c.

In accordance with one embodiment of the invention, non-volatile memory 406 includes a set of base instructions/ data 428 and a set of supplemental instructions/data 429. Base instructions/data 428 represent implementing instructions/data for one or more base functions/features of mobile communication device 400, whereas supplemental instructions/data 429 represent implementing instructions/data to modify one or more operational characteristics of mobile communication device 400. Supplemental instructions/data 429 may facilitate one or more newly added functions/ features to a base set of functions/features of mobile communication device 400, may facilitate the modification of one or more base functions/features of mobile communication device 400, and/or may facilitate the deactivation of one or more base functions/features from mobile communication device 400. In one embodiment, at least one of base instructions/data 428 and supplemental instructions/data 429 facilitates implementation of a set of business-related features/ functionalities by mobile communication device 400, and the remaining one of base instructions/data 428 and supplemental instructions/data 429 facilitates implementation of a set of non business-related functionalities.

Figure 5:
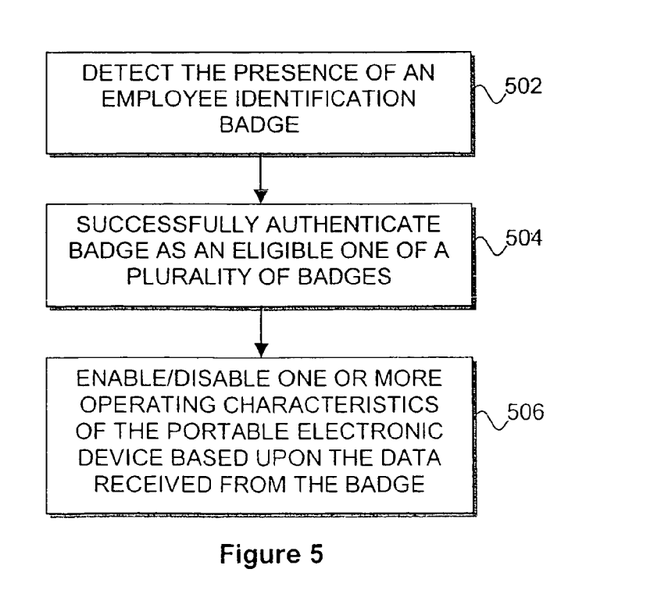
FIG. 5 illustrates an operational flow of one embodiment of a portable electronic device, such as mobile communication device 400, incorporating the teachings of the present invention.

FIG. 5 illustrates an operational flow of one embodiment of a portable electronic device, such as mobile communication device 400, incorporating the teachings of the present invention. As shown, the process begins by an employee identification badge being detected by the portable electronic device (block 502). As described above, detection may include reception of an RF signal originating from a contactless interface of an identification badge, or reception of a signal received via one or more pins/pads of a contact-based interface of an identification badge. Whether the identification badge is a contactless or contact-based badge, the portable electronic device is complementarily equipped with an appropriate one of a contactless and/or contact-based interface to facilitate such detection and the exchange data with the identification badge. Upon detecting the initial presence of the identification badge (at e.g. power on or reset or any arbitrary point in time selected by mobile communication device 400 or the identification badge), authentication logic 426 of mobile communication device 400 is given execution control, which in turn prompts the identification badge for certain information and challenges for the identification badge to authenticate itself to mobile communication device 400. In one embodiment, a memory component of the identification badge includes authentication logic 328 containing one or more bit patterns identifying the particular identification badge as being associated with a particular business and/or employee. In one embodiment, each such bit pattern stored within the identification badge forms a first part of a unique key, with the complementary part of the key being stored within an associated portable electronic device. Upon detection of the identification badge the identification badge is successfully authenticated as being at least an eligible one of a number of badges (block 504). Such authentication process may be based upon any number of individual or combined authentication methods known in the art. In one embodiment, the previously stored bit pattern key is used to authenticate the identification badge and/or employee accordingly. After authentication, operational characteristics of the portable electronic device can be modified based upon e.g. the bit patterns stored within the identification badge. In one embodiment, operational characteristic modification of the portable electronic device can be limited to only those times when identification badges including the proper key(s) are detected by the portable electronic device. In one embodiment, the bit patterns include additional data corresponding to one or more functions/features to be implemented by the portable electronic device as a result of authentication.

Portable Electronic Device Authentication Logic

As will be described in more detail below, in one embodiment, authentication logic 426, authenticates identification badge 110, with the cooperation of authentication logic 328, involving one or more challenges and responses between mobile communication device 400 and identification badge 110. In one embodiment, the challenges and responses are exchanged over a secured communication session, using a set of one or more session keys (SK) generated by authentication logic 426.

In one embodiment, the SKs are provided to authentication logic 328 in an encrypted form, employing a public key (BdgKpu) of identification badge 110, which has a corresponding private key (BdgKpr). In one embodiment, the public key BdgKpu of identification badge 110 is provided to authentication logic 426 in a signed form using a private signing key (CertSignKpr) of a certification authority, and via a certificate signed by the certification authority using its private master key (CertMstrKpr).

In one embodiment, successor challenges are dependent on predecessor responses. In one embodiment, the challenges and responses involve at least a subset of the implementing instructions/data of the functions/features of identification badge 110. In one embodiment, authentication logic 426 may be assisted by a remote server (mobile communication device 400 is equipped with appropriate communication capability). In one embodiment where authentication logic 426 is assisted by a remote server, authentication logic 426 may temporarily consider identification badge 110 to be authenticated, until it receives the determination or information contributing to the determination from the assisting remote server.

Figure 6:
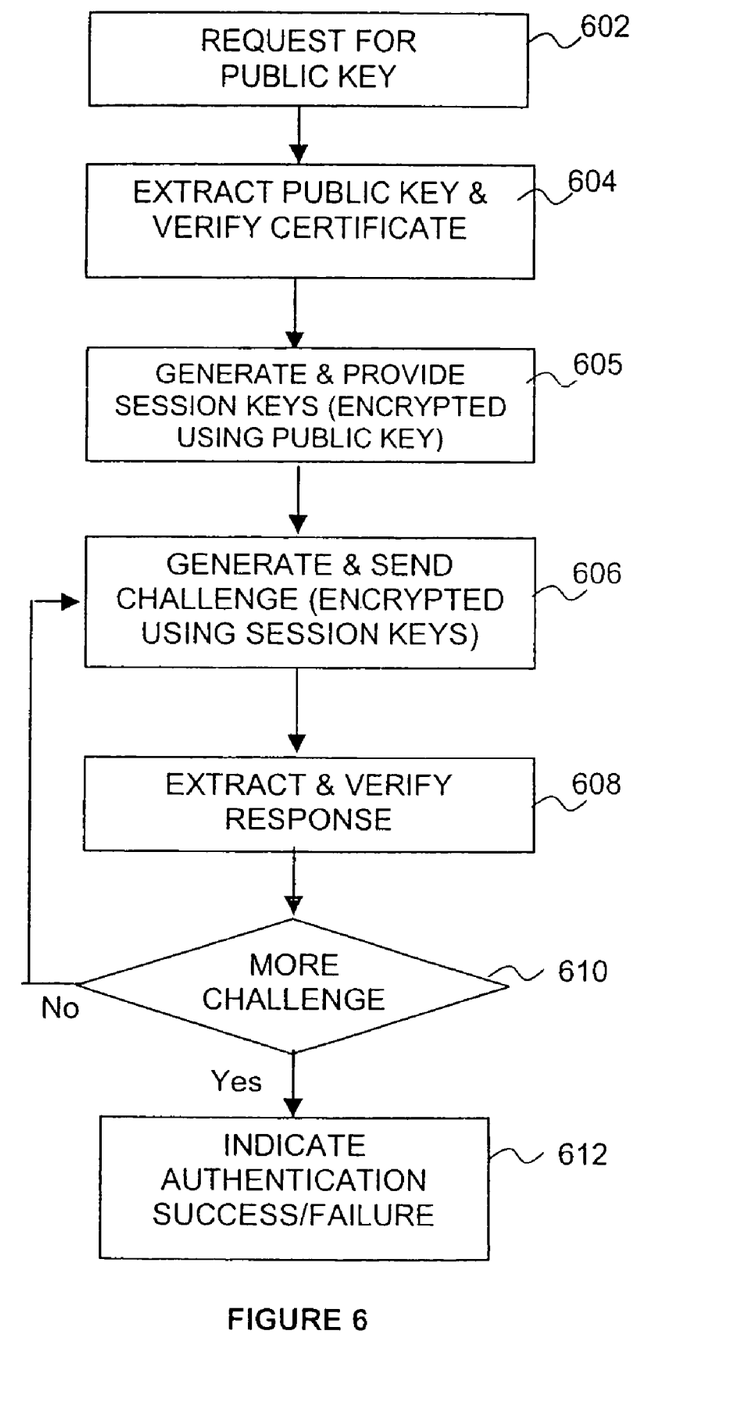
FIG. 6 illustrates an operational flow of aspects of authentication logic of an embedded electronic device, in accordance with one embodiment

FIG. 6 illustrates the operational flow of aspects of authentication logic 426 of FIG. 4, in accordance with one embodiment. As illustrated, upon given execution control, authentication logic 426 requests for a public key BdgKpu, block 602. Thereafter, authentication logic 426 waits for the response of identification badge 110. After a certain period of time has passed without a response from identification badge 110, authentication logic 426 may determine an authentication error has occurred, and discontinue waiting, in which case identification badge 110 is considered ineligible.

Eventually, authentication logic 426 receives the response. For the embodiment, it is assumed that if identification badge 110 is an eligible identification badge, the response will be in the form of a certificate signed by an authentication authority with the requested BdgKpu being embedded therein. Accordingly, upon receipt of the certificate, authentication logic 426 extracts BdgKpu using CertSignKpu, block 604. For the embodiment, as alluded to earlier, authentication logic 426 further verifies the certificate using CertMstrKpu.

Assuming the certificate is verified, authentication logic 426 generates a set of SKs to facilitate subsequent exchanges of challenges and responses between authentication logics 426 and 328, encrypts the SKs using the provide BdgKpu or an appropriate provided one of the BdgKpus, and provides the SKs in an encrypted form to authentication logic 328, block 605.

Then, authentication logic 426 provides a challenge, encrypting the challenge using the provided BdgKpu or an appropriate one of the provided BdgKpus, and transmits the encrypted challenge to identification badge 110, block 606. Thereafter, authentication logic 426 again waits for the response of identification badge 110.

Eventually, authentication logic 426 receives the response to the challenge it posed. For the embodiment, the response to the challenge is returned in an encrypted form using the provided SKs. Accordingly, upon receipt of the encrypted response to the challenge, authentication logic 426 recovers the response, decrypting the encrypted response using the generated Sks, and then verifies the recovered response, block 608. In one embodiment, verification includes verifying a digital signature stored within identification badge 110 for a first response to a first challenge using BdgKpu, and verifying hash values of data such as implementing instructions/data that may be stored in identification badge 110 for later responses to subsequent challenges.

At block 610, authentication logic 426 determines whether identification badge 110 has successfully responded to a sufficient number of challenges to be considered as an eligible cover.

Eventually, identification badge 110 has either successfully responded to a sufficient number of challenges to be considered as an eligible identification badge, or has failed to respond to a point that the identification badge is to be considered as ineligible. At such time, authentication logic 426 generates an indication for mobile communication device 400 denoting whether identification badge 110 is to be considered as an eligible or ineligible badge, block 612.

Thereafter, as described earlier, in one embodiment, mobile communication device 400 proceeds to modify one or more operational characteristics if the indication generated by authentication logic 426 denotes that identification badge 110 is an eligible cover.

Identification Badge Authentication Logic

Figure 7:
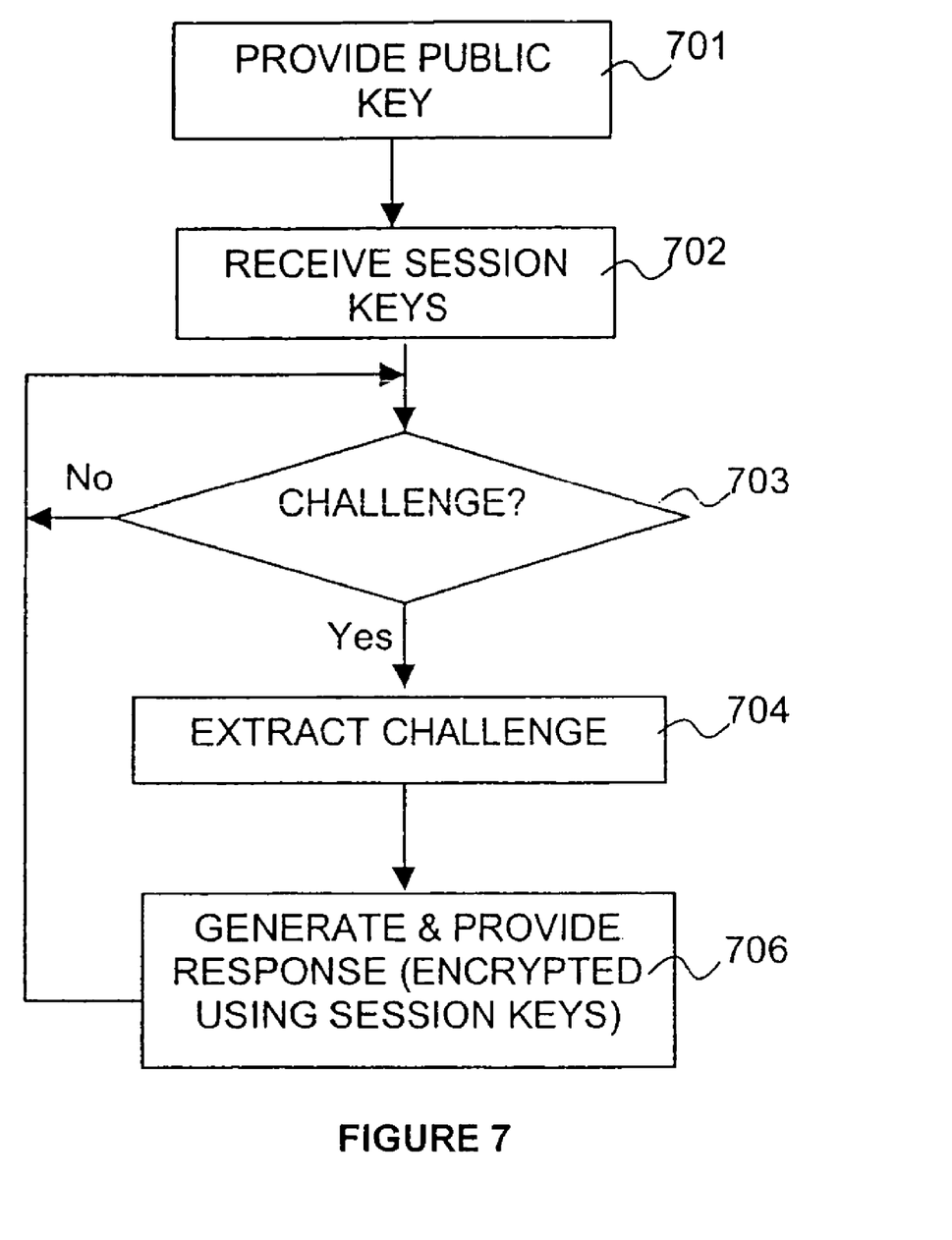
FIG. 7 illustrates an operational flow of aspects of authentication logic 328 of identification badge in accordance with one embodiment.

FIG. 7 illustrates the operational flow of aspects of authentication logic 328 in accordance with one embodiment. As illustrated, for the embodiment, upon receipt of a request for a BdgKpu from mobile communication device 400 by identification badge 110, authentication logic 328 provides authentication logic 426 of mobile communication device 400 a BdgKpu corresponding to its BdgKpr (in a signed form and by way of a signed certificate), block 701. Next, for the embodiment, authentication logic 328 receives a set of SKs from authentication logic 426, to facilitate subsequent exchanges of challenges and responses between authentication logics 426 and 328, block 702. Thereafter, authentication logic 328 waits for a challenge from authentication logic 426 of mobile communication device 400.

Eventually, authentication logic 328 receives the challenge encrypted using the SKs, as described earlier. In response, authentication logic 328 decrypts the encrypted challenge using the provided SKs, block 704. Upon recovering the challenge, authentication logic 328 provides a response to the challenge (generating it if necessary). For the embodiment, authentication logic 328 encrypts the response using the SKs, and provides the encrypted response as its reply to the challenge posted by authentication logic 426, block 706. Thereafter, authentication logic 328 waits for another challenge from authentication logic of mobile communication device 400. Once authentication logic 426 is satisfied that identification badge 110 is an eligible badge, authentication logic 426 ceases to pose further challenges.

Example Applications

Figure 8:
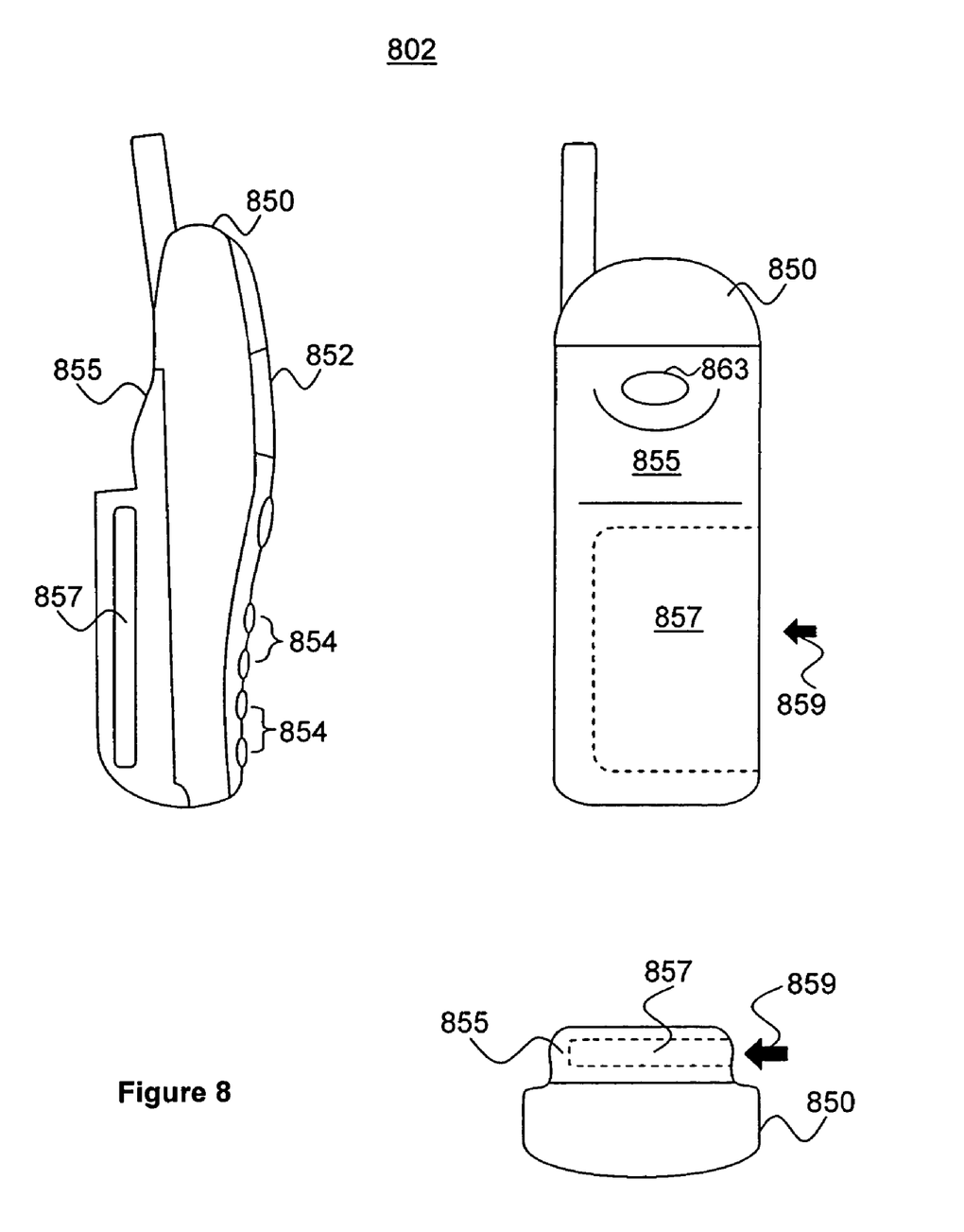
FIG. 8 illustrates an example wireless mobile phone incorporating the teachings of the invention in accordance with one embodiment.

FIG. 8 illustrates an example wireless mobile phone incorporating the teachings of the invention in accordance with one embodiment. As shown, wireless mobile phone 802 includes body portion 850 and battery portion 855. Body portion 850 includes display screen 852 and keys 854, while battery portion 855 includes release button 863 for separating battery portion 855 from body portion 850. Battery portion 855 represents any of a number of battery-types for providing operational power to wireless mobile phone 802. In the illustrated embodiment, battery portion 855 includes identification interface 857 to facilitate communication between wireless mobile phone 802 and an identification badge incorporated with the teachings of the present invention. In one embodiment, identification interface 857 includes a contact-based coupler, however in other embodiments identification interface 857 can include a contactless coupler either in addition to or in place of the contact-based coupler. Although not shown, body portion 850 is further equipped with complementary coupling facilities (e.g. such as contact pads, pins and/or antenna) to communicate with one or more identification badges through identification interface 857. Additionally, identification interface 857 need not necessarily be integrated with battery portion 855. Instead identification interface 857 may be integrated into body portion 850, or may be a separate detachable component to be used in conjunction with wireless mobile phone 802.

In the illustrated embodiment, identification interface 857 receives an identification badge inserted into identification interface 857 in the direction of arrow 859. In one embodiment, the identification badge is required to remain seated within identification interface 857 in order to modify one or more operational characteristics of wireless mobile phone 802 as described above. In other embodiments the identification badge may be removed from identification interface 857 so long as the badge has been authenticated.

Figure 9:
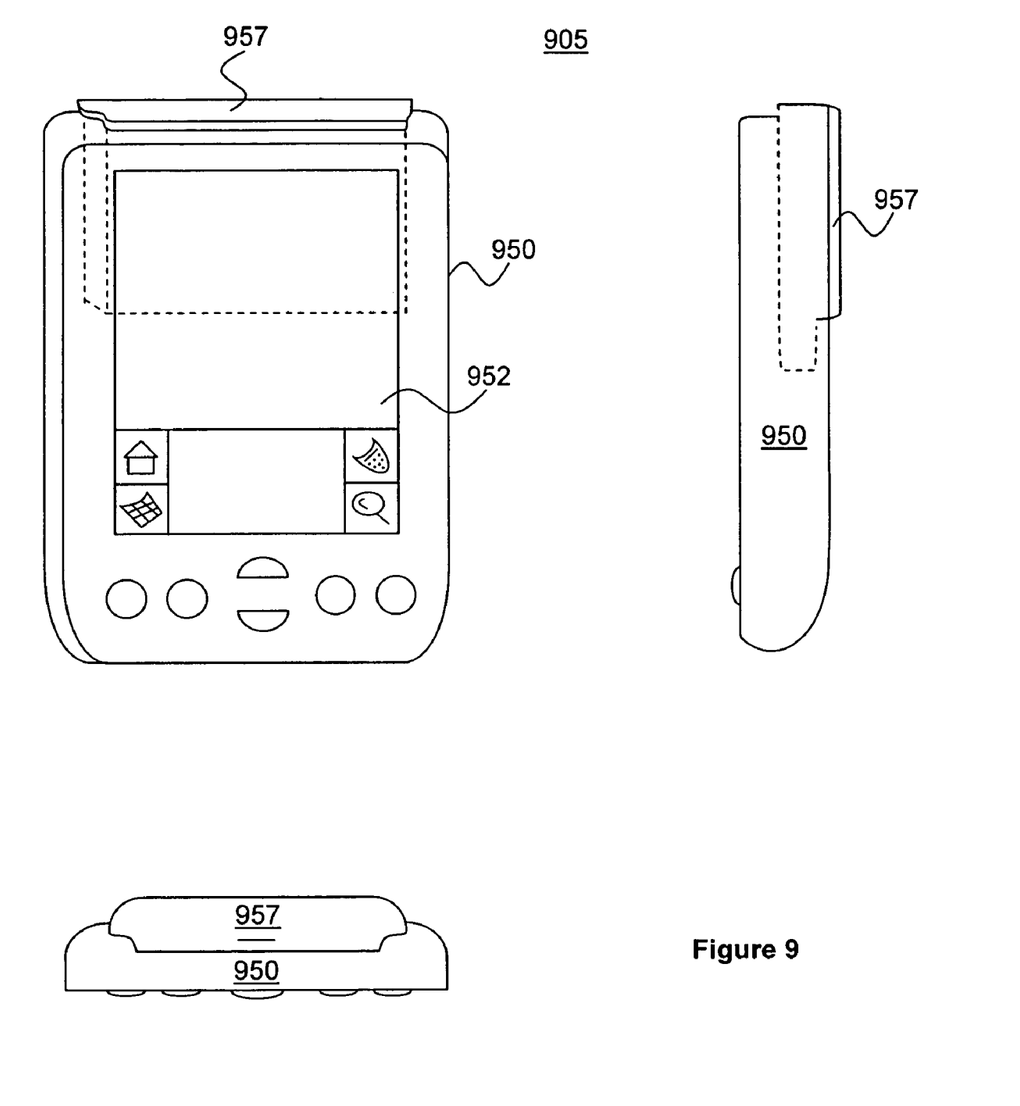
FIG. 9 illustrates an example PDA including a removable identification interface in accordance with one embodiment of the invention.

FIG. 9 illustrates an example PDA including a removable identification interface in accordance with one embodiment of the invention. As shown, PDA 905 includes body portion 950 having display screen 952, and removable identification interface 957 in the form of a PDA expansion module. Identification interface 957 includes a first interface (such as an RS-232 interface—not shown) through which PDA 950 communicates with expansion identification interface 957, and a second interface in the form of a contactless coupler, such as that shown in FIG. 3B, to facilitate wireless communication between expansion identification interface 957 (and ultimately PDA 950) and one or more identification badges incorporated with the teachings of the present invention. For example, in the illustrated example an employee could temporarily place such an identification badge in the vicinity (e.g. within the range of an RF transmitter) of expansion identification interface 957 in order to cause the detection and authentication of the identification badge, resulting in the modification of one or more operational characteristics of PDA 905 as described above.

Figure 10:
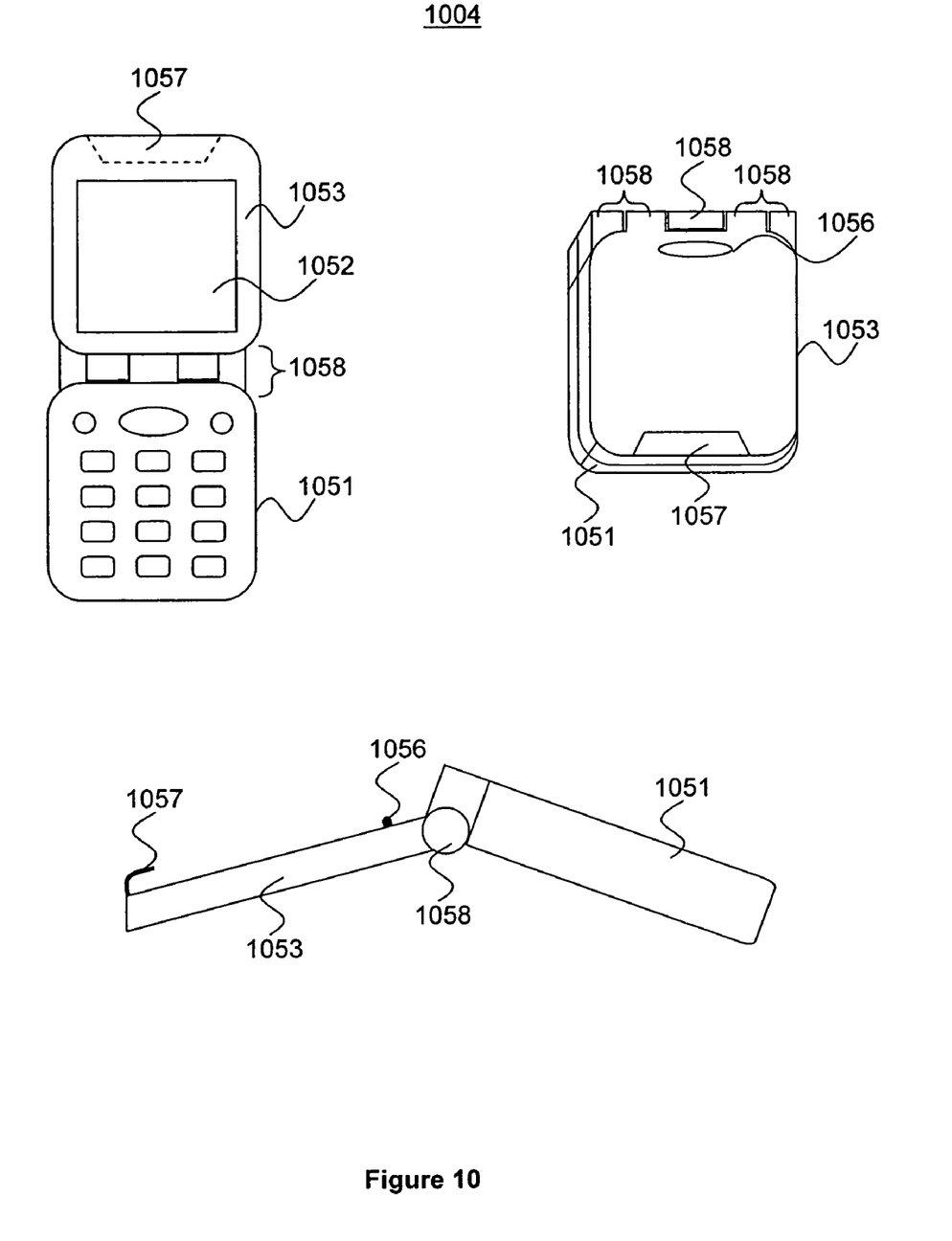
FIG. 10 illustrates an example wireless flip-phone/PDA device incorporated with the teachings of the present invention in accordance with one embodiment.

FIG. 10 illustrates an example wireless flip-phone/PDA device incorporated with the teachings of the present invention in accordance with one embodiment. As shown, flip-phone/PDA device 1004 (hereinafter flip-phone 1004) includes data input portion 1051 containing a number of data input facilities, hingedly coupled to display portion 1053 including display screen 1052 via hinges 1058. In accordance with one embodiment of the invention, flip-phone 1004 further includes identification badge holder 1056 and identification badge coupler 1057. Identification badge coupler 1057 represents a contact-based and/or contactless coupler to facilitate the exchange of instructions/data between an identification badge and flip-phone 1004. Identification badge holder 1056 is designed to assist in securing the identification badge in a position proximate to badge coupler 1057 to facilitate the exchange of data between flip-phone 1004 and the identification badge.

Conclusion and Epilogue

Thus, a method and apparatus for modifying operational characteristics of a portable electronic device has been described. While the present invention has been described in terms of the above-illustrated embodiments, those skilled in the art will recognize that the invention is not limited to the embodiments described. The present invention can be practiced with modification and alteration within the spirit and scope of the appended claims. For examples, the specific encryption/decryption technique used in a specific stage of the authentication process, and the kind, the number as well as the length of keys used may also vary from embodiments to embodiments. Likewise, the nature of challenges and responses, and the resulting operational states of the apparatus may all vary from embodiments to embodiments. Thus, the description is to be regarded as illustrative instead of restrictive on the present invention.

What is claimed is:

1. In a portable electronic device, a method of operation comprising:
   detecting a presence of an identification badge;
   authenticating the identification badge as an eligible one of a plurality of identification badges; and
   configuring the portable electronic device, upon successful identification badge authentication, with an authenticated mode of user operation including a first set of operating characteristics, wherein said authenticated mode of user operation replaces an unauthenticated mode of user operation including a second set of operating characteristics, said first and second set of operating characteristics both including at least one operating characteristic customizable by the user of the portable electronic device while the portable electronic device is in the unauthenticated mode of user operation but not while the portable electronic device is in the authenticated mode of user operation.

2. The method of claim 1, wherein the identification badge is detected by the portable electronic device via a contactless coupler.

3. The method of claim 2, wherein the authenticated mode of user operation remains configured so long as the identification badge remains communicatively coupled with the contactless coupler.

4. The method of claim 1, wherein the identification badge is detected by the portable electronic device via a contact-based coupler.

5. The method of claim 4, wherein the authenticated mode of user operation is remains configured so long as the identification badge remains communicatively coupled with the contact-based coupler.

6. The method of claim 1, wherein the portable electronic device is a selected one of a wireless mobile phone, a personal digital assistant, a handheld personal computer, a media player, and a game console.

7. The method of claim 1, wherein said detecting of a presence of an identification badge comprises communicating with an electronic device embedded within the badge.

8. The method of claim 7, wherein the electronic device comprises at least one of a central processing unit (CPU), a random access memory (RAM), a read only memory (ROM), and an electrically erasable programmable read only memory (EEPROM).

9. The method of claim 1, wherein said authenticating comprises:
   generating a first challenge;
   providing the first challenge to the identification badge;
   receiving from the identification badge, a first response to the first challenge; and
   verifying the correctness of the received first response.

10. The method of claim 1, further comprising:
requesting and receiving implementing instructions/data of a function/feature from the identification badge to enhance one or more functions/features of the portable electronic device.

11. The method of claim 1 further comprising:
disabling one or more functions/features of the portable electronic device resulting in the unauthenticated mode of operation, if the identification badge is not successfully authenticated.

12. The method of claim 1 further comprising:
enabling one or more functions/features of the portable electronic device if the identification badge is successfully authenticated.

13. A wireless communication device comprising:
a processor to execute instructions;
an interface communicatively coupled to the processor to facilitate an exchange of information between the wireless communication device and an identification badge; and
a storage medium coupled to the processor, and having stored therein a plurality of instructions designed to authenticate an identification badge as being at least an eligible one of a plurality of identification badges, and to configure the wireless communication device, upon successful identification badge authentication, with an authenticated mode of user operation including a first set of operating characteristics, wherein said authenticated mode of user operation replaces an unauthenticated mode of user operation including a second set of operating characteristics, said second set of operating characteristics including at least one operating characteristic customizable by the user of the wireless communication device while the wireless communication device is in the first operational mode but not the second operational mode.

14. The wireless communication device of claim 13, wherein the wireless communication device is a selected one of a wireless mobile phone, a wireless communication enabled personal digital assistant, a wireless communication enabled handheld personal computer, a wireless communication enabled media player, and a wireless communication enabled game console.

15. The wireless communication device of claim 13, wherein the identification badge comprises an integrated circuit including at least one of a central processing unit (CPU), a random access memory (RAM), a read only memory (ROM), and an electrically erasable programmable read only memory (EEPROM).

16. The wireless communication device of claim 13, wherein the interface comprises a contact-based coupler to physically couple the identification badge with the wireless communication device.

17. The wireless communication device of claim 16, wherein the plurality of instructions are further designed to revert operation of the wireless communication device from the identification badge authenticated mode of operation to the unauthenticated mode of operation if the identification badge is decoupled from the contact-based coupler.

18. The wireless communication device of claim 13, wherein the interface comprises a contactless coupler to communicatively couple the identification badge with the wireless communication device.

19. The wireless communication device of claim 18, wherein the identification badge is communicatively coupled to the wireless communication device so long as the identification card remains physically located within a predetermined distance from the wireless communication device.

20. The wireless communication device of claim 19, wherein the plurality of instructions are further designed to revert operation of the wireless communication device from an identification badge authenticated mode of operation to the unauthenticated base mode of operation if the identification badge is decoupled from the contactless coupler.

21. An identification badge comprising:
at least one integrated circuit embedded therein to store individualized authorized user information, which when transmitted to a personal electronic device, causes the personal electronic device to function in a second operational mode exhibiting a second set of operational characteristics, said second operational mode replacing a first operational mode exhibiting a first set of operational characteristics, said second and first sets of operational characteristics including at least a first operating characteristic configurable by the user of the personal electronic device while the device is in the first operational mode but not the second operational mode; and
an interface coupled to the integrated circuit to facilitate transmission of the individualized authorized user information from the identification badge to the wireless communication device.

22. The identification badge of claim 21, wherein the integrated circuit comprises at least one of a central processing unit (CPU), a random access memory (RAM), a read only memory (ROM), and an electrically erasable programmable read only memory (EEPROM).

23. The identification badge of claim 21, wherein the wireless communication device is a selected one of a mobile phone, a personal digital assistant, a handheld personal computer, a media player, and a game console.

24. The identification badge of claim 21, wherein the individualized authorized user information, when transmitted to a receiver, further provides the authorized user with access to a building.

25. The identification badge of claim 21, wherein the interface comprises a contact-based coupler to facilitate information exchange between the identification badge and a personal electronic device.

26. The identification badge of claim 21, wherein the interface comprises a contactless coupler to facilitate information exchange between the identification badge and a personal electronic device.

* * * * *